United States Patent [19]

Ferguson et al.

[11] Patent Number: 4,517,323

[45] Date of Patent: May 14, 1985

[54] MOLDED PRODUCTS

[75] Inventors: Larry W. Ferguson; Roger A. McFarland, both of Newark, Ohio

[73] Assignee: Owens-Corning Fiberglas Corporation, Toledo, Ohio

[21] Appl. No.: 284,440

[22] Filed: Jul. 20, 1981

[51] Int. Cl.³ .......................... B29D 3/02; B32B 7/00; B32B 5/16; B32B 31/04

[52] U.S. Cl. .................................. 523/514; 264/255; 264/258; 428/212; 428/283; 523/527

[58] Field of Search ............... 264/255, 257, 258, 134; 428/212, 168, 283; 523/514, 527

[56] References Cited

U.S. PATENT DOCUMENTS

| 3,903,343 | 9/1975 | Pfaff | 428/168 |
| 3,957,943 | 5/1976 | Ogura | 264/258 |
| 4,081,578 | 3/1978 | van Essen et al. | 264/255 |
| 4,189,517 | 2/1980 | Shanoski et al. | 264/255 |

FOREIGN PATENT DOCUMENTS

| 986566 | 3/1965 | United Kingdom | 264/255 |
| 1406229 | 9/1975 | United Kingdom | 264/255 |
| 1457935 | 12/1976 | United Kingdom | 264/255 |

Primary Examiner—Willard E. Hoag
Attorney, Agent, or Firm—Ronald C. Hudgens; Greg Dziegielewski; Debra L. Pawl

[57] ABSTRACT

Improved surface characteristics of sheet molding compounds are obtained by employing defined amounts of resin, glass and filler in the formulation comprising the appearance side and the reinforcing side of molded objects.

9 Claims, No Drawings

MOLDED PRODUCTS

TECHNICAL FIELD

This invention pertains to a method of producing fiber reinforced molded articles.

In one of its more specific aspects, this invention relates to a method of producing improved molded articles by reducing sink marks in molded glass fiber reinforced unsaturated polyester compositions and the molded articles produced by that method.

Recent developments in the field of glass fiber reinforced polyester resins have resulted in the production of unsaturated polyesters which exhibit comparatively little shrink upon molding and crosslinking. The use of such resins has expanded considerably the use of such materials as molding compounds, both sheet (SMC) and bulk (BMC), particularly when employed for the production of molded shapes having a first appearance surface and a second surface, opposite the appearance surface, designated hereinafter as the reinforcing surface. The reinforcing surface has projecting ribs, bases and inserts, which act to stiffen and strengthen the part. The part, in its normal use has exposed to view only the appearance surface as, for example, in automobile hoods in the outer surface is the appearance surface and the inner, ribbed surface is the usually unseen reinforcing surface.

However, recent efforts have been directed to reduce the still-existing problem of sink marks in the appearance surfaces above the ribs, bases and inserts of the reinforcing surface.

One method which has been found effective in this effort is that set forth in U.S. Pat. No. 3,903,343 to F. Pfaff. In that method, this objective is accomplished by distributing the fibers within the SMC part such that the average glass fiber length adjacent the appearance side is at least twice the average fiber length adjacent the second side and the average glass fiber length adjacent the first side is about 1 to 4 inches and the average fiber length adjacent the second side is $\frac{1}{8}$ to 1 inch. In addition, the weight of the short glass fibers comprise at least one half of the total fiber weight.

There has now been a development in this art which results in an improved surface over that of the prior art. According to this invention, there is provided a method for producing a molded object comprising an appearance surface and a reinforcing surface which method comprises incorporating in the appearance surface an amount of unsaturated polymeric resin equal to from about 40 to about 50 volume percent of the total volume of the appearance surface, a volume of glass fibers equal to from about 28 to about 30 volume percent of the total volume of the appearance surface, a volume of filler equal to from about 28 to about 30 volume percent of the total volume of the appearance surface, the amount of glass fibers equal to from about 35 to about 42 weight percent of the total weight of the components comprising the appearance surface and incorporating in the reinforcing surface an amount of unsaturated polymeric resin equal to from about 40 to about 50 volume percent. of the total volume of the reinforcing surface, a volume of glass equal to from about 10 to about 20 volume percent of the total volume of the reinforcing surface, a volume of filler equal to from about 34 to about 40 volume percent of the total volume of the reinforcing surface, the amount of glass equal to from about 22 to about 28 weight percent of the total weight of the components comprising the reinforcing surface.

In the preferred embodiment of the invention, the filler will be calcium carbonate having a particle size less than 300 mesh.

The method of this invention is employable with any compositions used as molding compounds comprising glass fiber and mineral reinforced low shrink unsaturated polyester systems. Such molding compositions, in general, are well known in the art as containing from about 5 to about 50 weight percent glass fibers with the remainder being a resinous mixture comprising low shrink unsaturated polyester resins, fillers, free radical catalysts or initiators, chemical thickening agents and mold release agents. Suitable fillers include calcium carbonate, as mentioned above, and other fillers conventional within the art. Such fillers are present in amounts from about 50 to about 300 parts by weight based on 100 parts by weight of resin.

The SMC or BMC can be from about 0.02 to 0.5 or more inch thick when the multiple ply embodiment is employed and from about 0.2 to 1, or more, inch thick when the single ply embodiment is employed. Any suitable number of plies can be employed.

Any type and physical dimension of fiber glass, as conventionally employed in SMC or BMC, can be employed. Preferably, in the appearance surface 2" average length glass fibers will be employed with $\frac{1}{2}$ average long glass fibers being employed in the reinforcing surface.

It is also to be understood that this invention is applicable to those instances in which the same, or unlike, resins are employed in the two surfaces and, also, where the same or ulike fillers, or mixtures thereof, are employed in the two surfaces.

The method of this invention is carried out in the prior art manner in regard to molding techniques. For example, from about 20 to about 80 percent of the mold surface is covered with the molding compound. The molding is then carried out at a sufficient temperature to initiate crosslinking at a mold pressure up to about 1200 psig for about 10 seconds. The mold pressure is then reduced to about 400 psig at which pressure it is maintained for up to 3 minutes after which the part is expelled from the mold.

EXXAMPLE I

A typical molding charge for a part produced in accordance with this invention was comprised of one ply as the "appearance" formulation representing 25 percent of the charge weight and three plies as the "reinforcing" formulation. The "appearance" formulation contained approximately 2-inch long chopped glass fibers in a low profile polyester resin system with a specific amount of calcium carbonate filler and a filler to glass volume ratio of about 1:1.

The "reinforcing" formulation contained approximately $\frac{1}{2}$ inch long glass fibers in a low profile polyester resin system with a specific amount of calcium carbonate filler. In this formulation, the filler to glass ratio was 2:1 and the glass content was approximately 62 weight percent of the glass content of the "appearance" formulation.

EXAMPLE II

A surface comparison was made between a typical prior art SMC formulation employing 2-inch chopped glass in the appearance formulation and $\frac{1}{2}$ inch chopped glass in the "reinforcing" formulation with Surfalyzer data being determined on the finished molded parts, with the following results:

| Composition | Typical SMC | Inventive SMC | Range of Invention |
| --- | --- | --- | --- |
| Appearance Formulation | | | |
| Resin, Vol. % | 46 | 41.4 | 40–43 |
| Glass, Vol. % | 23 | 29.3 | 28–30 |
| Filler, Vol. % | 31 | 29.3 | 28–30 |
| Glass, Wgt. % of Total | 29–30 | 40.0 | 35–42 |
| Reinforcing Formulation | | | |
| Resin, Vol. % | 46 | 41.4 | 40–50 |
| Glass, Vol. % | 23 | 19.5 | 16–20 |
| Filler, Vol. % | 31 | 39.1 | 34–40 |
| Glass Wgt. % of Total | 29–30 | 24–26 | 22–28 |
| Surfanalyzer Data | | | |
| Trace #1 | | | |
| Rib | 3840 | 1493 | — |
| Curvature | 6040 | 1875 | — |
| Trace #2 | | | |
| Rib | 4240 | 2025 | — |
| Curvature | 3000 | 3300 | — |
| Total | 17120 | 8693 | — |

In the above data, the rib values refer to the waviness of the appearance surface above a rib-supported section of the molded part. The curvature values represent the overal curvature of the trace over a distance of 11 to 12 inches with trace #2 being taken at 90° to trace #1.

The above data demonstrate the decided improvement of the surface of a molded product produced in accordance with the invention in comparison with the surface of a molded product produced by typical molding compound formulations.

It will be evident from the foregoing that various modifications can be made to this invention. Such, however, are considered within the scope of the invention.

We claim:

1. A method for producing a molded object comprising an appearance surface and a reinforcing surface which comprises incorporating in the appearance surface an amount of unsaturated polymeric resin equal to from about 40 to about 50 volume percent of the total volume of the appearance surface, a volume of glass fibers equal to from about 28 to about 30 volume percent of the total volume of the appearance surface, a volume of filler equal to from about 28 to about 30 volume percent of the total volume of the appearance surface, the amount of glass fibers equal to from about 35 to about 42 weight percent of the total weight of the components comprising the appearance surface and incorporating in the reinforcing surface an amount of unsaturated polymeric resin equal to from about 40 to about 43 volume percent of the total volume of the reinforcing surface, a volume of glass equal to from about 16 to about 20 volume percent of the total volume of reinforcing surface, a volume of filler equal to from about 34 to about 40 volume percent of the total volume of the reinforcing surface, the amount of glass equal to from about 22 to about 28 weight percent of the total weight of the components comprising the reinforcing surface.

2. The method of claim 1 in which said filler is calcium carbonate having a particle less than 300 mesh.

3. The method of claim 1 in which said unsaturated polymeric resin comprises a polyester.

4. The method of claim 1 in which the glass fibers of said appearance surface are 2 inches in average length and the glass fibers of said reinforcing surface are ½ inch in average length.

5. The method of claim 1 in the same resins are employed in said appearance surface and in said reinforcing surface.

6. The method of claim 1 in which said object is molded at a pressure up to about 1200 psig for a period of about 10 seconds.

7. The method of claim 1 in which said appearance surface comprises about 41.4 volume percent resin, about 29.3 volume percent glass, about 29.3 volume percent filler, said glass comprising about 40 percent of the total weight of said appearance surface.

8. The method of claim 1 in which said reinforcing surface comprises about 41.4 volume percent resin, about 19.5 volume percent glass, about 39.1 volume percent filler, said glass comprising about 24 to about 26 percent of the total weight of said reinforcing surface.

9. A molded object produced by the method of claim 1.

* * * * *

UNITED STATES PATENT AND TRADEMARK OFFICE
CERTIFICATE OF CORRECTION

PATENT NO. : 4,517,323

DATED : May 14, 1985

INVENTOR(S) : LARRY W. FERGUSON and ROGER A. McFARLAND

It is certified that error appears in the above-identified patent and that said Letters Patent is hereby corrected as shown below:

Column 2, line 34 should read "....the same or <u>unlike</u> fillers, ...."

Column 2, line 47 should have spelling correction from EXXAMPLE to <u>EXAMPLE</u>.

Column 3, line 16 should be underlined like this: <u>Surfanalyzer Data</u>

Column 4, line 10 should read "....volume of glass <u>fibers</u> equal...."

Signed and Sealed this

Twenty-sixth Day of November 1985

[SEAL]

Attest:

DONALD J. QUIGG

Attesting Officer

Commissioner of Patents and Trademarks